(12) United States Patent
Yenney et al.

(10) Patent No.: US 9,622,290 B1
(45) Date of Patent: Apr. 11, 2017

(54) METHOD AND SYSTEM FOR SELECTIVELY NOTIFYING AN ESTABLISHMENT OF MOBILE-STATION REGISTRATION ATTEMPTS

(75) Inventors: Christopher M. Yenney, Ashburn, VA (US); Ryan S. Talley, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1861 days.

(21) Appl. No.: 12/423,939

(22) Filed: Apr. 15, 2009

(51) Int. Cl.
*H04W 88/12* (2009.01)
*H04W 84/12* (2009.01)
*H04W 84/04* (2009.01)

(52) U.S. Cl.
CPC ......... *H04W 84/12* (2013.01); *H04W 84/045* (2013.01)

(58) Field of Classification Search
CPC ... H04W 84/12; H04W 84/04; H04W 84/045; H04W 88/06
USPC .......................................................... 370/338
See application file for complete search history.

(56) References Cited

U.S. PATENT DOCUMENTS

| 5,970,227 | A | 10/1999 | Dayan et al. | |
|---|---|---|---|---|
| 6,826,696 | B1* | 11/2004 | Chawla et al. | 726/4 |
| 2001/0048744 | A1* | 12/2001 | Kimura | 380/247 |
| 2002/0191575 | A1* | 12/2002 | Kalavade et al. | 370/338 |
| 2004/0058717 | A1* | 3/2004 | McDonnell et al. | 455/567 |
| 2005/0085248 | A1 | 4/2005 | Ballay et al. | |
| 2006/0198333 | A1 | 9/2006 | Sabo et al. | |
| 2006/0274713 | A1* | 12/2006 | Pandey et al. | 370/346 |
| 2007/0072590 | A1 | 3/2007 | Levitan | |
| 2007/0249323 | A1* | 10/2007 | Lee et al. | 455/411 |
| 2008/0031211 | A1* | 2/2008 | Kalavade et al. | 370/338 |
| 2008/0177994 | A1* | 7/2008 | Mayer | 713/2 |
| 2008/0240078 | A1* | 10/2008 | Thubert et al. | 370/351 |
| 2008/0261514 | A1* | 10/2008 | Pratt et al. | 455/3.06 |
| 2008/0305802 | A1* | 12/2008 | Barnes et al. | 455/445 |
| 2009/0180141 | A1* | 7/2009 | Takaishi et al. | 358/1.15 |
| 2009/0276300 | A1* | 11/2009 | Shaw et al. | 705/14.1 |
| 2010/0027469 | A1* | 2/2010 | Gurajala et al. | 370/328 |
| 2010/0109864 | A1* | 5/2010 | Haartsen et al. | 340/539.13 |
| 2011/0009062 | A1* | 1/2011 | Anschutz et al. | 455/41.2 |

* cited by examiner

Primary Examiner — Luat Phung
Assistant Examiner — Saad A Waqas

(57) ABSTRACT

Methods and systems are provided for identifying customers at an establishment. In an embodiment, a low-cost Internet base station (LCIB) receives a request from a mobile station to register for service with the LCIB. The LCIB is located at an establishment, such as a store. The LCIB then determines whether the mobile station is authorized to register with the LCIB. If the mobile station is authorized to register with the LCIB, the LCIB allows the mobile station to register. If the mobile station is not authorized to register with the LCIB, the LCIB or LCIB controller responsively (a) rejects the registration request and (b) sends a notification message to the establishment, the notification message identifying the mobile station.

21 Claims, 4 Drawing Sheets

METHOD AND SYSTEM FOR SELECTIVELY NOTIFYING AN ESTABLISHMENT OF MOBILE-STATION REGISTRATION ATTEMPTS

BACKGROUND

1. Cellular Wireless Networks

Many people use mobile stations, such as cell phones and personal digital assistants (PDAs), to communicate with cellular wireless networks. These mobile stations and networks typically communicate with each other over a radio frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1×RTT networks" (or "1× networks" for short), which stands for "Single Carrier Radio Transmission Technology." Another CDMA protocol that may be used is known as Evolution Data Optimized (EV-DO), perhaps in conformance with one or more industry specifications such as IS-856, Release 0 and IS-856, Revision A. Other protocols may be used as well, such as Global System for Mobile Communications (GSM), Time Division Multiple Access (TDMA), WiMax, and/or any others.

These networks typically provide services such as voice, Short Message Service (SMS) messaging, and packet-data communication, among others, and typically include a plurality of base stations, each of which provide one or more coverage areas, such as cells and sectors. When a mobile station is positioned in one of these coverage areas, it can communicate over the air interface with the base station, and in turn over one or more circuit-switched and/or packet-switched signaling and/or transport networks to which the base station provides access.

The base stations for these networks are typically not associated with any subscriber or small group of subscribers in particular; rather, they are placed in publicly-accessible locations and are used by the service provider's customers generally. These base stations collectively blanket cities, rural areas, etc. with coverage; as such, they are referred to generally and herein as "macro (or macro-network) base stations" and the network they collectively form—or to which they collectively belong—is referred to generally and herein as the "macro network."

Mobile stations and macro base stations conduct communication sessions (e.g. voice calls and data sessions) over frequencies known as carriers, each of which may actually be a pair of frequencies, with the base station transmitting to the mobile station on one of the frequencies, and the mobile station transmitting to the base station on the other. This is known as frequency division duplex (FDD). The base-station-to-mobile-station link is known as the forward link, while the mobile-station-to-base-station link is known as the reverse link.

2. Low-Cost Internet Base Stations (LCIBs)

Many macro-network subscribers, including private consumers and small businesses, among others, in addition to having wireless service (which may include data service) for their mobile station (or mobile stations), also have high-speed (a.k.a. "broadband") Internet access through another communication channel, which may be cable-modem service, digital-subscriber-line (DSL) service, satellite-based Internet service, and/or some other option.

In an exemplary arrangement, a user may have a cable modem connected (a) via coaxial cable to a cable provider's network and (b) via Ethernet cable to a wireless (e.g. IEEE 802.11 (WiFi)) router. That router may include one or more Ethernet ports to which computers or other devices may be connected, and may also include wireless-access-point functionality, providing a WiFi packet-data interface to, as examples, laptop computers, digital video recorders (DVRs), appliances, and/or any other computing devices or their wireless network adapters.

To address gaps in macro-network coverage (e.g. in buildings) and for other reasons, macro-network service providers have recently begun offering consumers devices referred to herein as Low-Cost Internet Base Stations (LCIBs), which may also be referred to as femtocells (femto base stations, femto base transceiver stations (BTSs)), picocells (pico base stations, pico BTSs), microcells (micro base stations, micro BTSs), and by other names. Note that the aforementioned terms that end in "cell" may also be generally and herein used to refer to the coverage area provided by the respective device. Note also that "low-cost" is not used herein as a limiting term; that is, devices of any cost may be categorized as LCIBs, though most LCIBs typically will be less expensive on average than most macro-network base stations.

A typical LCIB may be approximately the size of a desktop phone or WiFi access point, and is essentially a low-power, low-capacity version of a macro base station. Thus, a typical LCIB will use a normal power outlet, perhaps with a transformer providing a DC power supply. The LCIB may have a wired (e.g. Ethernet) or wireless (e.g. WiFi) connection with the user's router, and would thus have connectivity to the Internet and/or one or more other packet-data networks via the user's broadband connection. An LCIB may establish a virtual-private-network (VPN) connection over the Internet with an entity (e.g. a VPN terminator) on the wireless-service (macro-network) provider's core network, and thereby be able to securely communicate via the VPN terminator with other entities on that core network and beyond.

The LCIB also has a wireless-communication (e.g. CDMA) interface that is compatible with the user's mobile station(s), such that the LCIB may act as a micro base station, providing coverage on the wireless-service provider's network via the user's Internet connection. Usually, an LCIB will provide service on a single RF carrier (or on a single carrier per technology, where multiple technologies (e.g. CDMA and EV-DO) are supported), and also transmit what is known as a pilot beacon, which includes administrative messages and parameters that mobile stations use to connect with the LCIB. And LCIBs typically include a Global Positioning System (GPS) receiver for use in receiving and decoding GPS signals, for use in determination of location, as well as for use in synchronizing operations with other LCIBs and with the macro network, based on timing information embedded in GPS signals. Typically, LCIBs have fairly comprehensive auto-configuration capabilities, such that they are largely "plug-and-play" to the user.

Overview

Methods and systems are provided for identifying mobile station users as they enter an establishment. In one embodiment, an LCIB located at an establishment receives a request from a mobile station to register for service with the LCIB. The LCIB then determines whether the mobile station is authorized to register with the LCIB. If the mobile station is authorized to register with the LCIB, the LCIB responsively allows the mobile station to register with the LCIB. On the other hand, if the mobile station is not authorized to register with the LCIB, the LCIB responsively rejects the registration request and an LCIB switch responsively sends a notification message to the establishment. The notification message identifies the mobile station.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

Figure 1:
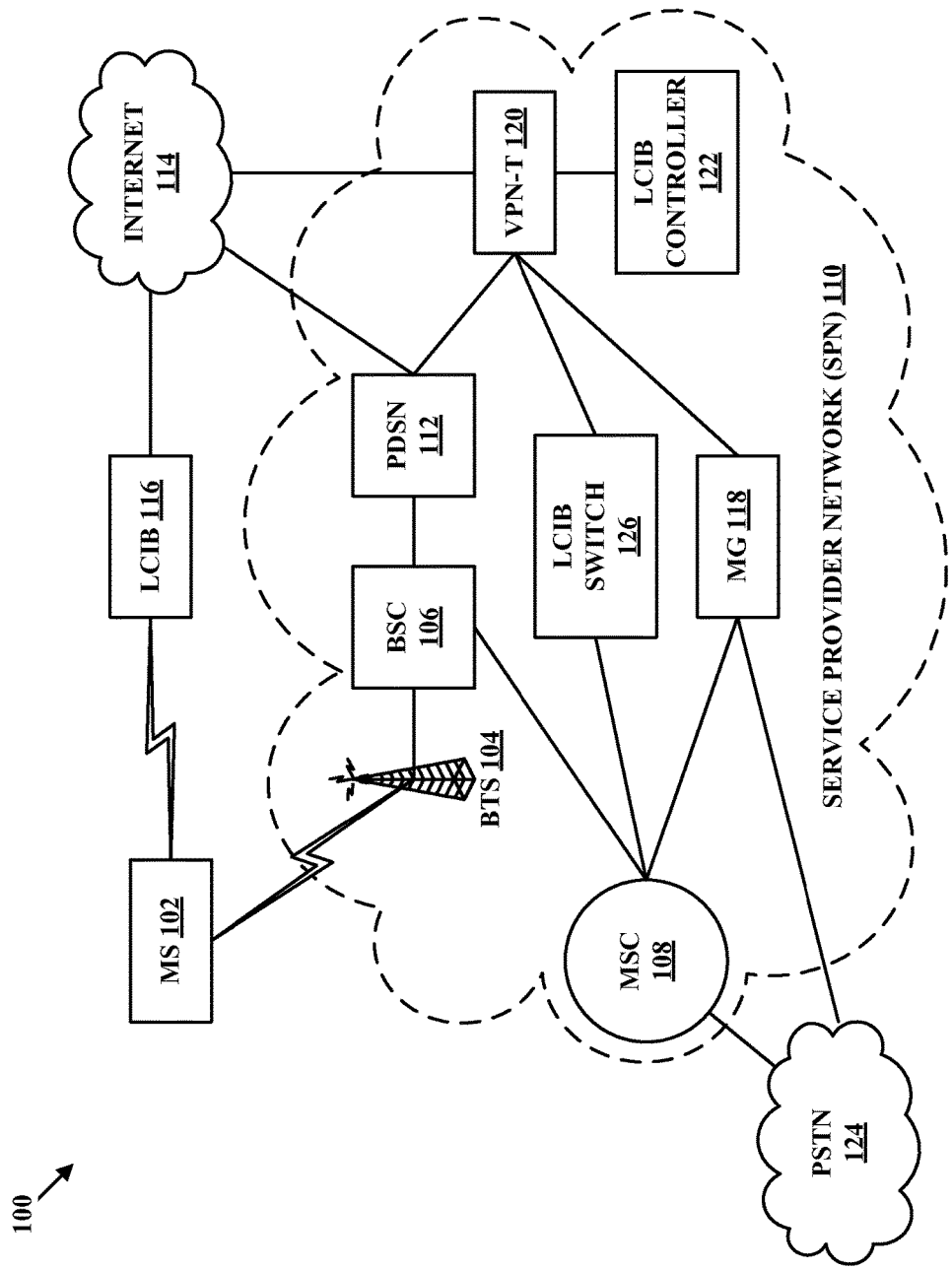
FIG. 1 depicts a communication system, in accordance with exemplary embodiments.

As noted above, LCIBs are designed to have low transmission-power capabilities, and consequently to provide coverage areas that are relatively limited in comparison with those of typical macro base stations. As examples, a typical LCIB may be designed to provide a coverage area that is the size of a dorm room, an apartment, a condominium, a house, a store, etc.

Further, LCIBs are typically able to operate in what are referred to herein as a restricted mode and a non-restricted mode. In restricted mode, use of (i.e. communication via) the LCIB is restricted to a list of authorized mobile stations. For example, the LCIB may maintain a list of five mobile identification numbers (MINs) that each correspond to a mobile station that is authorized to use the LCIB. Note that this number of mobile stations and manner of identifying them (i.e. by MIN) are examples only, and that the list could also or instead be maintained by one or more network entities in communication with the LCIB. The list could be provided by phone to a customer-service representative that could send the list via the Internet to the LCIB. Or the user could manage the list via a website or local HTML interface. And other examples are possible. In non-restricted mode, any mobile stations in the coverage area of the LCIB can use the LCIB.

Since an LCIB may identify a mobile station attempting to register with the LCIB and thereafter may determine whether the mobile station is a pre-determined user authorized to use the LCIB, an LCIB may be used to identify mobile stations operating under the coverage of an LCIB. As presently contemplated, in accordance with embodiments of the present invention, an LCIB system may be used to identify users as they enter a specific establishment and to notify the establishment of the users entering the establishment. For example, a specific business establishment may use an LCIB to identify customers entering the establishment and the establishment may use this identification to improve customer service.

A somewhat initial step in accordance with the present invention is to receive a request from a mobile station to register for service with an LCIB. The LCIB is located at an establishment, which may be a business establishment such as a restaurant or a store. The LCIB may receive a request from the mobile station to register for service with the LCIB when a user carrying the mobile station enters the establishment. After receiving the request to register for service with LCIB, the LCIB may determine whether the mobile station is authorized to register with the LCIB.

If the mobile station is authorized to register with the LCIB, the LCIB may allow the mobile station to register with the LCIB. A mobile station that is authorized to register could be, for example, a mobile station of an employee of the establishment. On the other hand, if the mobile station is not authorized to register with the LCIB, the LCIB may reject the registration request of the mobile stations. Further, an entity such as the LCIB, the LCIB switch, or an intermediate server could send a notification message to the establishment. The notification message identifies the mobile station Beneficially, in accordance with an embodiment, an establishment may be notified of users entering the establishment. The establishment may use this notification simply for identification purposes. Additionally or alternatively, the establishment may use this notification in order to take some sort of action related to the users. For example, the establishment may use the notification to identify customers entering the establishment and thereafter use the information from the notification message for customer-service purposes. By identifying customers as they enter an establishment, the business establishment may prepare to serve customers even before speaking to the customer. This identification and notification process may be beneficial to the establishment, as it may result in improved customer service and/or improved business efficiency, as examples.

2. Exemplary Architecture a. An Exemplary Communication System

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes a mobile station (MS) 102, a macro BTS 104, a base station controller (BSC) 106, a mobile switching center (MSC) 108, a service provider network (SPN) 110, a packet data serving node (PDSN) 112, the Internet 114, an LCIB 116, a media gateway 118, a VPN terminator (VPN-T) 120, an LCIB controller 122, a public switched telephone network (PSTN) 124, and an LCIB switch 126. And additional entities could be present as well, such as additional mobile stations in communication with BTS 104, additional entities in communication with Internet 114 and/or PSTN 124, etc.

Also, there could be one or more devices and/or networks making up at least part of one or more communication links. For example, there could be one or more routers, cable modems, and/or other devices or networks on the link between LCIB 116 and Internet 114.

Mobile station 102 may be any mobile device arranged to carry out the mobile-station functions described herein. As such, mobile station 102 may include a user interface, a wireless-communication interface, a processor, and data storage comprising instructions executable by the processor for carrying out those mobile-station functions. The user interface may include buttons, a touch-screen, a microphone, and/or any other elements for receiving inputs, as well as a speaker, one or more displays, and/or any other elements for communicating outputs.

The wireless-communication interface may include an antenna and a chipset suitable for communicating with one or more macro base stations and/or one or more LCIBs over suitable air interfaces. For example, the chipset could be suitable for CDMA communication. The chipset or wireless-communication interface in general may also or instead be able to communicate with other types of networks and devices, such as EV-DO networks, Wi-Fi networks, Bluetooth devices, and/or one or more additional types of networks and devices. The processor and data storage may be any suitable components known to those of skill in the art. As examples, mobile station 102 could be or include a cell phone, a PDA, a computer, a laptop computer, a hybrid CDMA/EV-DO device, and/or a multi-mode cellular/Wi-Fi device.

Macro BTS 104 may be any network element arranged to carry out the macro-BTS functions described herein. As such, macro BTS 104 may include a communication interface, a processor, and data storage comprising instructions executable by the processor to carry out those macro-BTS functions. The communication interface may include one or more antennas, chipsets, and/or other components for providing one or more CDMA (and/or other protocol) coverage areas such as cells and sectors, for communicating with mobile stations such as mobile station 102 over an air interface. The communication interface may also include one or more wired (e.g. Ethernet) and/or wireless (e.g. WiFi) interfaces for communicating with at least BSC 106.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least macro BTS 104, MSC 108, and PDSN 112. In general, BSC 106 functions to control one or more macro BTSs such as macro BTS 104, and to provide those one or more macro BTSs with connections to devices such as MSC 108 and PDSN 112.

Note that the combination of macro BTS 104 and BSC 106 may be considered a macro base station. However, macro BTS 104 or BSC 106 could, taken alone, be considered a macro base station as well. Furthermore, a macro base station may be considered to be either or both of those devices, and perhaps make use of one or more functions provided by MSC 108, PDSN 112, and/or any other entity, without departing from the invention.

MSC 108 may be any networking element arranged to carry out the MSC functions described herein. Thus, MSC 108 may include a communication interface, a processor, and data storage comprising instructions executable by the processor to carry out those MSC functions. The communication interface may include one or more wired and/or wireless interfaces for communicating with at least BSC 106, MG 118, LCIB switch 126, and PSTN 124. In general, MSC 108 acts as a switch between (a) PSTN 124 and (b)(i) one or more BSCs such as BSC 106 and (ii) one or more LCIB switches such as LCIB switch 126, facilitating communication between mobile stations and PSTN 124, which may be the public switched telephone network.

Service-provider network 110 may encompass all of the network elements depicted in FIG. 1 as being included in its dashed-cloud shape. In general, there may be more and/or different communication links among entities within service-provider network 110, and there may be more and/or different connections between service-provider network 110 and outside entities. Furthermore, there may be a core packet network (not depicted) making up part of service-provider network 110, which may enable devices therein to communicate with each other. There may also be one or more other packet-data networks and/or elements, one or more circuit-switched networks and/or elements, one or more signaling networks and/or elements, and/or one or more of any other suitable network(s) and/or element(s).

PDSN 112 may be any networking element arranged to carry out the PDSN functions described herein. As such, PDSN 112 may include a communication interface, a processor, and data storage comprising instructions executable by the processor for carrying out those PDSN functions. The communication interface may include one or more wired and/or wireless interfaces for communicating with at least BSC 106, VPN terminator 120, and Internet 114. In general, PDSN 112 acts as a network access server between (a) Internet 114 and (b)(i) BSCs such as BSC 106 and (ii) VPN terminators such as VPN terminator 120, facilitating packet-data communication between mobile stations and Internet 114, via macro base stations and LCIBs.

Internet 114 may be the well-known global packet-data network generally referred to as the Internet. However, Internet 114 may also be or include one or more other packet-data networks, without departing from the scope and spirit of the present invention. As such, Internet 114 may include one or more wide area networks, one or more local area networks, one or more public networks, one or more private networks, one or more wired networks, one or more wireless networks, and/or one or more networks of any other type. Devices in communication with Internet 114 may exchange data using a packet-switched protocol such as the Internet Protocol (IP), and may be identified by an address such as an IP address.

LCIB 116 may be any computing and communication device arranged to carry out the LCIB functions described herein. As such, LCIB 116 may include a communication interface, a processor, and data storage comprising instructions executable by the processor for carrying out those LCIB functions. The communication interface may include (a) a wireless interface for communicating with one or more mobile stations according to a protocol such as CDMA (and/or one or more other technologies) and (b) an Ethernet or WiFi interface for communicating with a device such as a router and/or a cable modem. LCIB 116 may also have a GPS receiver and/or other location module. LCIB 116 is also described in connection with FIG. 2.

Media gateway (MG) 118 may be any networking element arranged to carry out the media-gateway functions described herein. As such, MG 118 may include a communication interface, a processor, and data storage comprising instructions executable by the processor for carrying out those media-gateway functions. The communication interface may include a circuit-switched interface and a packet-switched interface. In operation, MG 118 may (a) receive packet-based communications from entities on SPN 110, convert those to circuit-switched communications, and pass them to MSC 108 and/or PSTN 124 and (b) receive circuit-switched communications from MSC 108 and/or PSTN 124, convert those to packet-based communications, and pass them to entities on SPN 110.

VPN terminator 120 may be any networking element arranged to carry out the VPN-terminator functions described herein. Thus, VPN terminator 120 may include a communication interface, a processor, and data storage comprising instructions executable by the processor for carrying out those VPN-terminator functions. The communication interface may include one or more wired and/or wireless interfaces for communicating with at least PDSN 112, MG 118, LCIB controller 122, LCIB switch 126, and Internet 114. In general, VPN terminator 120 functions to establish secure VPN connections over Internet 114 with LCIBs such as LCIB 116, enabling the LCIBs to securely communicate with devices on SPN 110 and perhaps beyond. LCIB controller 122 may be any networking element arranged to carry out the LCIB-controller functions described herein. Thus, LCIB controller 122 may include a communication interface, a processor, and data storage comprising instructions executable by the processor for carrying out those LCIB-controller functions. The communication interface may include one or more wired and/or wireless interfaces for communicating with at least VPN terminator 120, along with perhaps one or more other entities on SPN 110, and beyond.

Among other functions, LCIB controller 122 communicates via VPN terminator 120 with LCIBs such as LCIB 116. LCIB controller 122 may receive requests from various LCIBs for configuration data, and those requests may include, among other values, indications of the LCIBs' respective locations. LCIB controller 122 may also be operable to select various operational parameters for LCIBs (e.g. carrier, PN offset, whether to broadcast a pilot-beacon, contents of any pilot beacon to be broadcast, transmission-power level), and to transmit those parameters to LCIBs, perhaps along with other configuration data and messaging.

LCIB switch 126 may be any networking element arranged to carry out the LCIB-switch functions described herein. As such, LCIB switch 126 may include a communication interface, a processor, and data storage comprising instructions executable by the processor for carrying out those LCIB-switch functions. The communication interface may include one or more wired and/or wireless interfaces for communicating with at least MSC 108 and VPN terminator 120. In general, LCIB switch 126 acts as a switch between MSC 108 and VPN terminator 120, enabling mobile stations communicating via LCIBs to engage in calls over PSTN 124 via MSC 108.

b. An Exemplary LCIB

Figure 2:
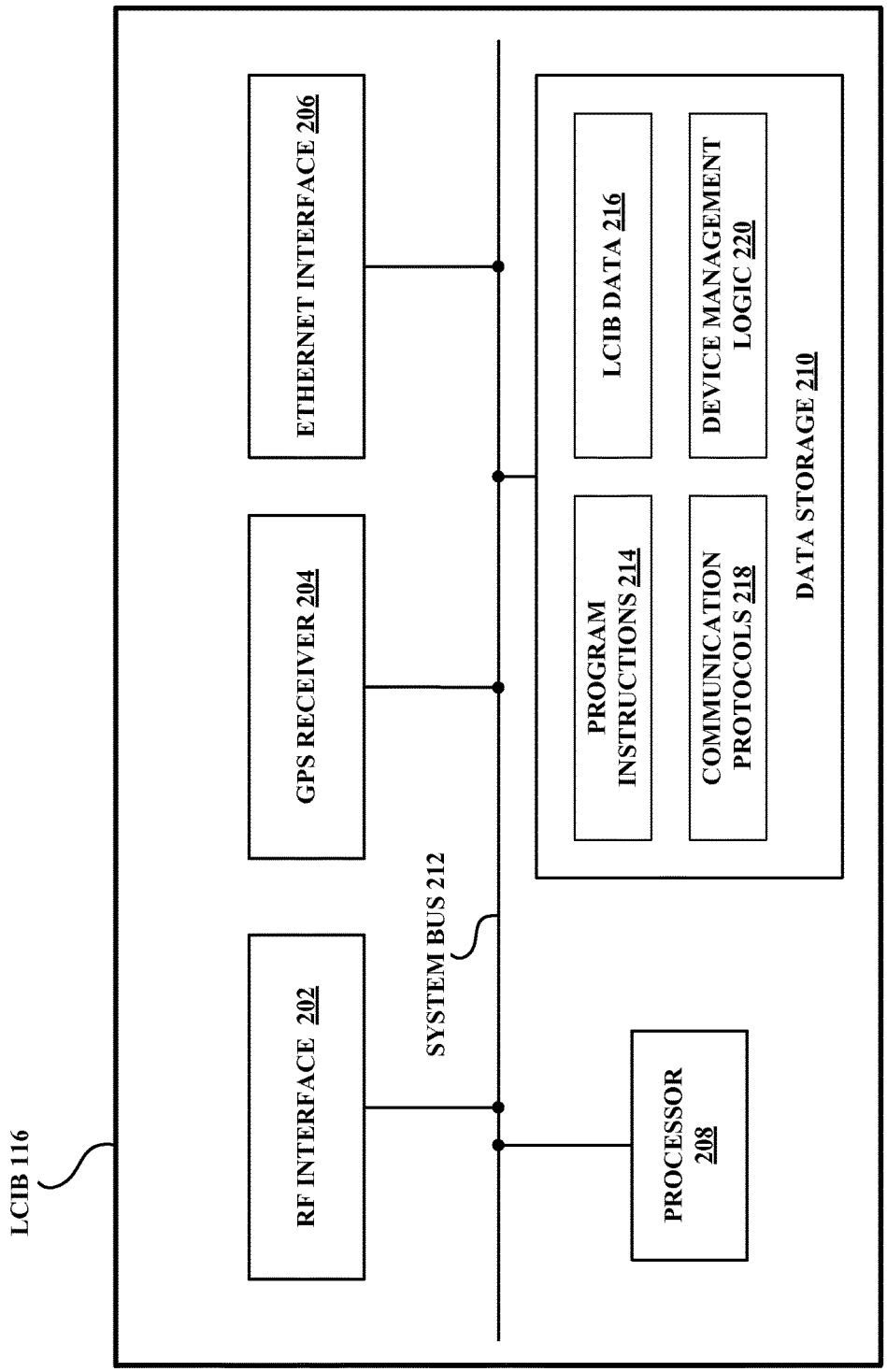
FIG. 2 depicts an LCIB, in accordance with exemplary embodiments.

FIG. 2 depicts an exemplary diagram of LCIB 116, which includes an RF interface 202, a GPS receiver 204, an Ethernet interface 206, a processor 208, and data storage 210, all communicatively linked by a system bus 212. Note that LCIB 116 could have additional and/or different components, and that this structure is provided by way of example.

RF interface 202 may include one or more antennas, one or more chipsets, a set of one or more channel elements, and/or one or more other components suitable for providing a wireless coverage area according to a wireless-communication protocol such as CDMA (and/or one or more other technologies). GPS receiver 204 may be any known or hereafter-developed GPS receiver, suitable for receiving and decoding GPS signals for location and timing purposes, perhaps among other purposes. In some embodiments, an LCIB may have a location module in addition to or instead of a GPS receiver.

Ethernet interface 206 may provide a wired packet-data interface for communicating with a device such as a router or cable modem. Processor 208 may comprise multiple (e.g., parallel) processors, such as a general purpose microprocessor and/or a discrete digital signal processor. The data storage 210 may take various forms, in one or more parts, such as a non-volatile storage block and/or a removable storage medium, and may include (a) program instructions 214 executable by processor 208 for carrying out the LCIB functions described herein, (b) LCIB data 216, which may be any operational data or other type of data stored for use by LCIB 116, (c) communication protocols 218, facilitating and enabling communication with one or more other devices, and (d) device management logic 220, perhaps for memory and file management.

3. Exemplary Operation a. A First Exemplary Method

Figure 3:
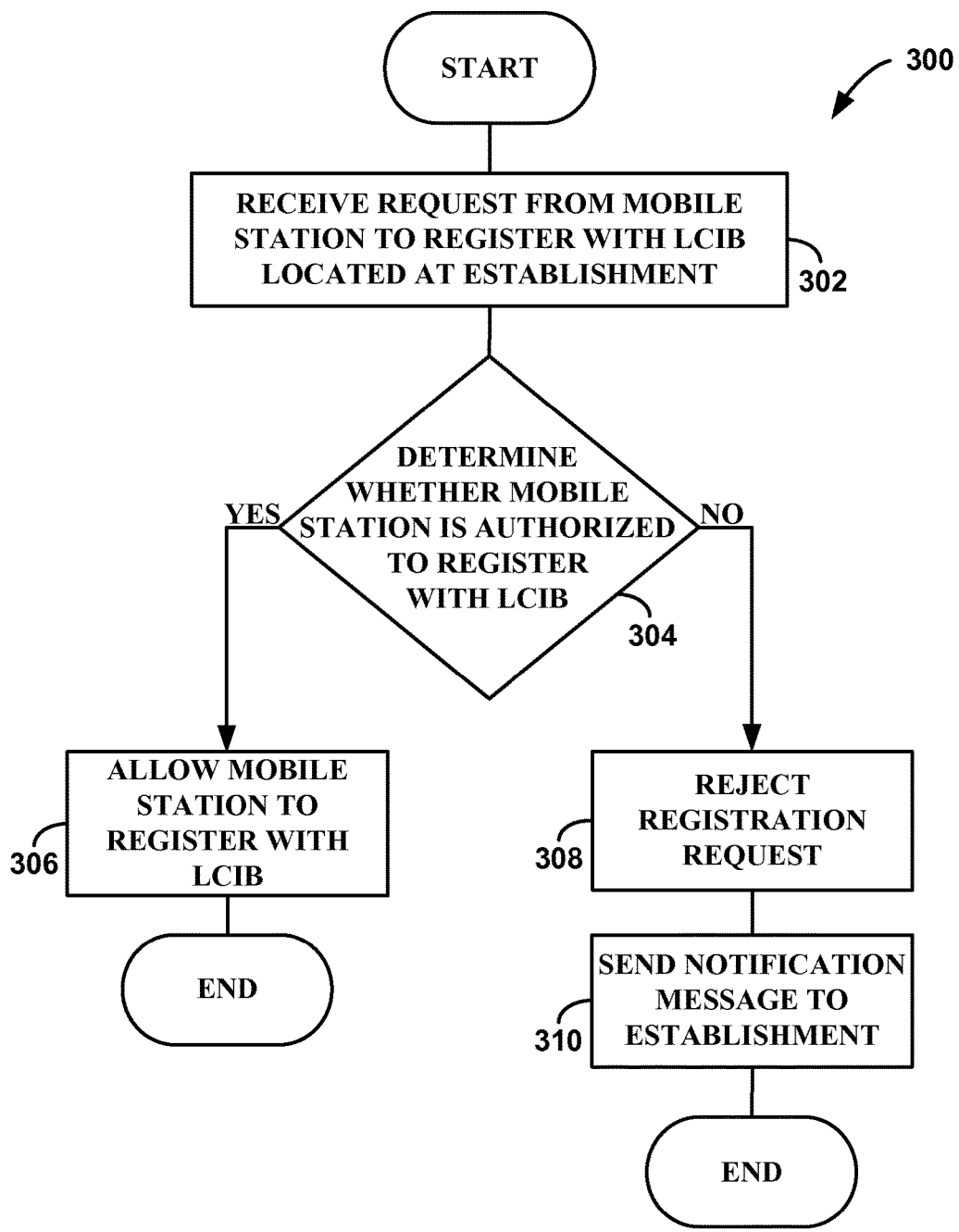
FIG. 3 depicts a flowchart of a method, in accordance with exemplary embodiments.

FIG. 3 depicts a flowchart of a first exemplary method, in accordance with an exemplary embodiment. As shown in FIG. 3, method 300 begins at step 302, where LCIB 116 receives a request from mobile station 102 to register for service with LCIB 116. LCIB 116 is located at an establishment, such as a business establishment. At step 304, LCIB 116 determines whether mobile station 102 is authorized to register with the LCIB. If mobile station 102 is authorized to register with LCIB 116, at step 306, LCIB 116 then allows mobile station 102 to register. On the other hand, if mobile station 102 is not authorized to register with the LCIB, at step 308, LCIB then rejects the registration request and, at step 310, LCIB switch 126 then sends a notification message to the establishment. The notification message identifies the mobile station.

These steps are further explained in the following subsections. And although method 300 is described as being carried out primarily by LCIB 116 and LCIB switch 126, this is not required. In some embodiments, method 300 may be carried out by LCIB 116 in cooperation with one or more other entities, such as an intermediate server. In general, method 300 could be carried out by any one or any combination of the network elements described herein, or any other network element(s). Further, although method 300 is described primarily in reference to a customer entering a business establishment, this is not required.

i. Receiving a Registration Request

At step 302, LCIB 116 receives a request from a mobile station, such as mobile station 102, to register for service. As mentioned above, LCIB 116 is located at an establishment such as a business establishment. The business establishment may be a store, hotel, restaurant, home, or dormitory. Other establishments are possible as well.

LCIB 116 may be located—and its transmission range configured—such that mobile stations of users entering the establishment attempt to register with the LCIB. The user may be a customer of the establishment, a patron of the establishment, a guest of the establishment, etc. In an embodiment, LCIB 116 receives the registration request from mobile station 102 when the user enters the business establishment. LCIB 116 may have a configurable transmission range that may determine the coverage area of the LCIB. This configurable transmission range may be adjusted to achieve the desired transmission range for covering the entrance of the business establishment.

As a user of mobile station 102 enters the establishment and the mobile station 102 enters the coverage area of LCIB 116, mobile station 102 may detect a pilot beacon broadcast by LCIB 116. Mobile station 102 may responsively send the registration request to the LCIB. Other methods of registration are possible as well.

In an embodiment, LCIB 116 is located and its transmission range configured such that the transmission range does not cover the entire establishment. For example, if the entire establishment comprises 1,000 square feet and the entrance of the establishment comprises a 25 square-foot area, the transmission range of LCIB 116 could configured to have a transmission range that would cover only the 25 square-foot area of the entrance. Therefore, a mobile station of any customer entering that establishment at any point would attempt to register with the LCIB. However, the transmission range would not be so large as to cover the entire business establishment. Such a transmission range would prevent mobile stations carried by individuals in the establishment or individuals passing by the establishment from repeatedly attempting to register for service.

In an embodiment, the LCIB is positioned so that it is out-of-sight from the customers entering the business, yet capable of transmitting in the entrance. However, it should be understood that any location in or around the business establishment may be used.

ii. Determining Whether the Mobile Station is Authorized

At step 304, LCIB 116 determines whether mobile station 102 is authorized to register with the LCIB. As mentioned above, LCIBs are typically able to operate in what are referred to as a restricted mode and a non-restricted mode, and they may maintain a list of identifiers (e.g. MINs) that each correspond to a mobile station that is authorized to use the LCIB, when the LCIB is operating in restricted mode.

The request from mobile station 102 may comprise an identifier of the mobile station (e.g. MIN). The LCIB may use this identifier in order to determine whether mobile station 102 is authorized to register with the LCIB. When LCIB 116 receives a request from a mobile station to register for service, LCIB 116 may refer to this list of MINs that each correspond to a mobile station that is authorized to use the LCIB. If the MIN for mobile station 102 is not on this list, LCIB 116 may determine that mobile station 102 is not authorized to register. If the MIN for mobile station 102 is on this list, LCIB 116 may determine that mobile station 102 is authorized to register. Other methods of determining whether an LCIB is authorized are possible as well, such as but not limited to querying a network entity.

iii. If the Mobile Station is Authorized

If mobile station 102 is authorized to register, then at step 306, LCIB 116 may allow the mobile station to register with LCIB 116. Once mobile station 102 is registered, mobile station 102 could use LCIB for service. Mobile stations authorized to register could, for example, be mobile stations of a store owner, store management, or store employees. Other examples are possible as well.

iv. If the Mobile Station is not Authorized

If mobile station 102 is not authorized to register, then steps 308 and 310 may be carried out. At step 308, LCIB 116 may then reject the registration request. At step 310, LCIB switch 126 (or LCIB 116, or another entity) may then send a notification message to the establishment. The notification message may serve to alert the establishment that a user has recently entered the establishment. Beneficially, in response to this notification message, employees of the establishment may, as one example, make preparations to serve the user.

The notification message can be composed and sent in a variety of ways. Generally, the notification message may be sent by any entity in the wireless network to any entity to which the establishment has access. Further, the notification message also generally includes sufficient information to allow the establishment to identify and serve the user that recently entered the establishment.

In an exemplary scenario, after LCIB 116 rejects the registration of mobile station 102, LCIB 116 may send the identifier (e.g. MIN) of mobile station 102 to LCIB switch 126. LCIB switch 126 may then compose and send a notification message to the establishment indicating that mobile station 102 recently entered the establishment. Alternatively, LCIB 116 may send the identifier of mobile station 102 to an intermediate server. The intermediate server may then send a notification message to the establishment indicating that mobile station 102 recently entered the establishment. Beneficially, sending MINs of non-registered users to an intermediate server may minimize the processing burden on LCIB switch 116.

As mentioned above, the notification message sent to the establishment may include enough information to aid the establishment in identifying the user and/or prepare to service the user. This amount of information may vary depending on how much information the establishment needs or prefers to receive in order to service customers.

The notification message may include information from the mobile-service account of the mobile station that attempted to register for service with LCIB 116. The LCIB switch 126 or intermediate server may use the identifier to identify the mobile-service account. The mobile-service account may comprise information associated with the user of the mobile stations. For example, the mobile-service account may contain the name of the user of the mobile station. Therefore, the LCIB switch 126 or intermediate server may compose a notification message includes the name of the user of the mobile station that recently entered the establishment.

The notification message also may be tailored to each particular establishment and/or each particular customer. For example, an establishment may just need the name of the customer entering the establishment in order to serve the customer. The establishment may have a service database that has a service profile of its customers. For example, the establishment may be a restaurant that has a reservation list. When the establishment receives a notification message that includes the name of the customer, the establishment could cross-reference this name to the reservation list in order to identify the customer's reservation.

In other instances, however, an establishment may require additional information. For example, in an exemplary scenario, an establishment may have a plurality of entrances, such as a north entrance and a south entrance, and an LCIB located at each entrance. In such a scenario, in addition to including the customer name, the notification message may include information sufficient to identify the specific entrance the customer entered.

The type of notification message sent to the establishment may vary. For example, the notification message could be an e-mail message to a designated e-mail account. As another example, the notification message could be a web-based message that is sent to a web-based program accessible by the establishment. For instance, the establishment may have a computer that is running a web-based notification program that is linked with the LCIB controller 122. The notification message may be sent to this web-based program, and an employee of the establishment could check the web-based program for notification messages.

The notification message may also vary depending on the priority level of the customer entering the establishment. For example, for a high-profile customer, the notification message may be a Short Message Service (SMS) text message sent to the store manger. For low-profile customers, however, a web-based notification message may suffice. Different establishments may have different needs and/or different preferences for the type and/or delivery of notification messages. Accordingly, the type and/or delivery of the notification message may be specifically tailored to the establishment's needs.

Once the establishment receives the notification message regarding mobile station 102, the establishment may use this notification message to provide service to a user associated with mobile station 102. For example, an employee at the establishment may be ready to greet the customer prior to speaking with the customer. As another example, by knowing the customer that has arrived, the establishment could send a specific salesperson to meet and greet the customer, where the salesperson is selected based on the customer's profile. As yet another example, after receiving the notification message, the establishment may responsively add the user of mobile station 102 to a service queue. Many other examples of customer service in response to the notification message are possible as well.

The embodiments above have been described primarily with reference to a single LCIB (LCIB 116), a single mobile station (mobile station 102), and a single establishment. However, in an embodiment, the LCIB switch 126 or the intermediate server could be in communication with a plurality of LCIBs located at a plurality of establishments. The LCIB switch 126 or the intermediate server could collect MINs of unauthorized mobile stations from each LCIB in the plurality of LCIBs. Based on these MINs, LCIB switch 126 or the intermediate server could send notification messages to the appropriate establishments.

The LCIB switch 126 or the intermediate server could collect these MINs and could periodically compose and send respective notification messages to the appropriate establishments. For example, the LCIB switch 126 or the intermediate server could be programmed to send notification messages every 15-30 seconds. Alternatively, the LCIB switch 126 or the intermediate server could send notification messages in real-time.

In an alternative embodiment, rather than the LCIB switch 126 or the intermediate server sending notification message to the appropriate establishments, the establishments could periodically query the LCIB switch 126 or the intermediate server in order to determine whether the LCIB switch 126 or the intermediate server has received a registration from an unauthorized user. And other arrangements are possible as well.

b. A Second Exemplary Method

Figure 4:
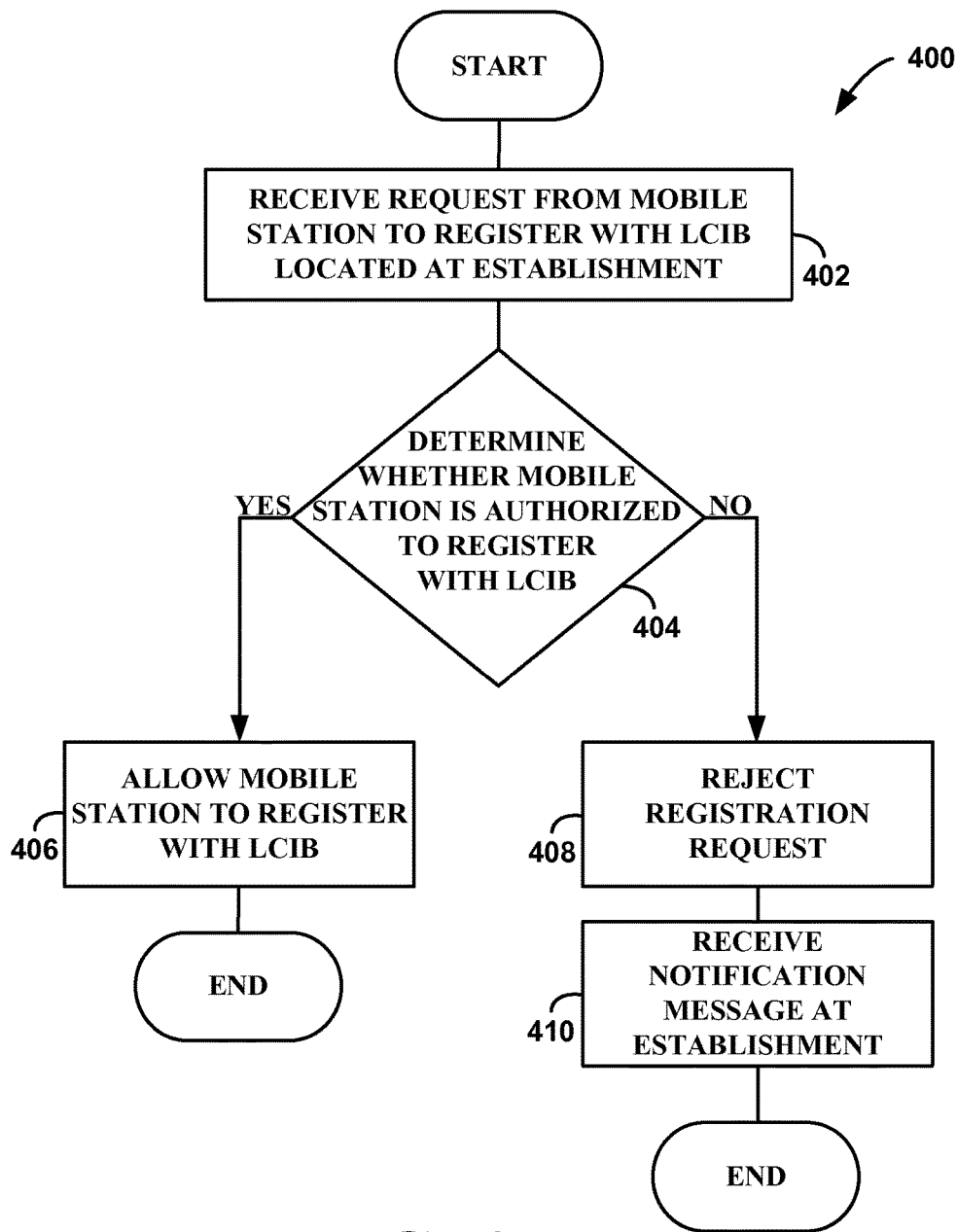
FIG. 4 depicts a flowchart of a method, in accordance with exemplary embodiments.

FIG. 4 is a flowchart of a second exemplary method, in accordance with an exemplary embodiment. Note that method 400 may be carried out by an LCIB, LCIB switch, and/or a server; furthermore, method 400 is related in some respects to method 300, and thus is not described in as great of detail. It should be explicitly noted, however, that any possibilities and permutations described above with respect to method 300 may equally apply to method 400, and vice versa.

As shown in FIG. 4, method 400 begins at step 402, where LCIB 116 receives a request from a mobile station to register for service with LCIB 116. LCIB 116 is located at an establishment, such as a business establishment. At step 404, LCIB 116 determines whether the mobile station is authorized to register with the LCIB. If the mobile station is authorized to register with LCIB 116, at step 406, LCIB 116 then allows the mobile station to register. On the other hand, if the mobile station is not authorized to register with the LCIB, then, at step 408, LCIB 116 then rejects the registration request. At step 410, the establishment receives a notification message, the notification message identifying the mobile station.

The establishment may receive the notification message from a network entity, such as LCIB 116, LCIB switch 126, or a server. The network entity may send a notification message after each registration request from an unauthorized user. On the other hand, the network entity may periodically send a notification message or notification messages to the establishment. For example, the network entity may send a notification message every 30 seconds, every minute, every five minutes, etc. This notification message may identify one or more mobile stations. For instance, if a network entity is configured to send a notification message every 30 seconds, and if three unauthorized mobile stations attempt to register with LCIB 116 in a 30 second time period, the notification message sent to the establishment may identify all three mobile stations. Additionally or alternatively, the establishment may query a network entity in order to receive any notification messages. Querying a network entity may be periodic, such as every 30 seconds, every minute, every five minutes, etc. Querying a network entity may also be manual.

4. Conclusion

Various exemplary embodiments have been described above. Those skilled in the art will understand, however, that changes and modifications may be made to those examples without departing from the scope of the claims.

What is claimed is:

1. A method comprising:
   receiving a request from a mobile station to register for service with a low-cost Internet base station (LCIB), wherein the LCIB is located at an establishment;
   making a determination that the mobile station is not authorized to register with the LCIB; and
   in response to making the determination that the mobile station is not authorized to register with the LCIB, (a) rejecting the registration request and (b) automatically sending, within a given amount of time from making the determination, a notification message indicating that the mobile station is physically present at the establishment to an entity selected from the group consisting of a designated email account associated with the establishment and a designated device at the establishment other than the LCIB, wherein the given amount of time is less than five minutes, and wherein the notification message identifies the mobile station.

2. The method of claim 1, wherein the mobile station is associated with a mobile service account, and wherein the notification message comprises a name associated with the mobile-service account.

3. The method of claim 2, further comprising using an identifier of the mobile station to identify the mobile-service account.

4. The method of claim 3, wherein the identifier of the mobile station is a mobile identification number (MIN).

5. The method of claim 3, wherein the request comprises the identifier of the mobile station.

6. The method of claim 1, further comprising the mobile station detecting a pilot beacon broadcast by the LCIB, and responsively sending the request to the LCIB.

7. The method of claim 1, wherein the notification is a message selected from the group consisting of an e-mail message, a web-based message, and a Short Message Service (SMS) text message.

8. The method of claim 1, wherein sending the notification message comprises sending a Short Message Service (SMS) text message to the designated device.

9. The method of claim 1, further comprising the establishment receiving the notification message, and responsively adding at least one of the mobile station and a user of the mobile station to a service queue.

10. The method of claim 1, wherein the establishment uses the notification message to provide service to a user associated with the mobile station.

11. The method of claim 1, carried out by one or more entities selected from the group consisting of an LCIB, an LCIB controller, an LCIB switch, and a server.

12. The method of claim 1, wherein the LCIB has a configurable transmission range, and wherein the LCIB is located and its transmission range configured such that mobile stations of users entering the establishment attempt to register with the LCIB, and such that the transmission range does not cover the entire establishment.

13. The method of claim 12, wherein the LCIB is located near an entrance of the establishment.

14. The method of claim 1, further comprising using an identifier of the LCIB to identify the establishment.

15. The method of claim 1, wherein the establishment is selected from the group consisting of a store, a restaurant, a house, an apartment, a dormitory, and a business establishment.

16. The method of claim 1, wherein an intermediate server sends the notification message to the entity selected from the group consisting of the designated email account and the designated device.

17. The method of claim 1, further comprising selecting a type of notification message based on a priority of a customer associated with the mobile station.

18. A system comprising:
a communication interface;
a processor; and
data storage comprising instructions executable by the processor to:
receive a request from a mobile station to register for service with a low-cost Internet base station (LCIB), wherein the LCIB is located at an establishment;
make a determination that the mobile station is not authorized to register with the LCIB; and
in response to making the determination that the mobile station is not authorized to register with the LCIB, to (a) reject the registration request and (b) automatically send, within a given amount of time from making the determination, a notification message indicating that the mobile station is physically present at the establishment to an entity selected from the group consisting of a designated email account associated with the establishment and a designated device at the establishment other than the LCIB, wherein the given amount of time is less than five minutes, and wherein the notification message identifies the mobile station.

19. The system of claim 18, wherein the system comprises one or more entities selected from the group consisting of the LCIB, an LCIB controller, and LCIB switch, and a server.

20. A method comprising:
receiving a request from a mobile station to register for service with a low-cost Internet base station (LCIB), wherein the LCIB is located at an establishment;
making a determination that the mobile station is not authorized to register with the LCIB; and
in response to the determination that the mobile station is not authorized to register with the LCIB, (a) rejecting the registration request, and (b) receiving, at an entity selected from the group consisting of a designated email account associated with the establishment and a designated device at the establishment other than the LCIB, a notification message indicating that the mobile station is physically present at the establishment, wherein the notification message is received within a given amount of time after making the determination, wherein the given amount of time is less than five minutes, and wherein the notification message identifies the mobile station.

21. The method of claim 20, wherein a network entity is configured to send the notification message to the entity selected from the group consisting of the designated email account and the designated device.

* * * * *